(12) United States Patent
Browning et al.

(10) Patent No.: US 10,139,895 B2
(45) Date of Patent: Nov. 27, 2018

(54) TECHNIQUES TO MAINTAIN POWER FOR A FUNDAMENTAL FUNCTION ON A DEVICE

(71) Applicant: INTEL CORPORATION, Santa Clara, CA (US)

(72) Inventors: David W. Browning, Portland, OR (US); Paul M. Zagacki, Lake Oswego, OR (US)

(73) Assignee: INTEL CORPORATION, Santa Clara, CA (US)

( * ) Notice: Subject to any disclaimer, the term of this patent is extended or adjusted under 35 U.S.C. 154(b) by 384 days.

(21) Appl. No.: 14/757,768

(22) Filed: Dec. 23, 2015

(65) Prior Publication Data

US 2017/0185133 A1 Jun. 29, 2017

(51) Int. Cl.
*G06F 1/26* (2006.01)
*G06F 1/32* (2006.01)

(52) U.S. Cl.
CPC ............ *G06F 1/329* (2013.01); *G06F 1/3212* (2013.01); *G06F 1/3296* (2013.01); *Y02D 10/172* (2018.01); *Y02D 10/174* (2018.01); *Y02D 10/24* (2018.01)

(58) Field of Classification Search
None
See application file for complete search history.

(56) References Cited

U.S. PATENT DOCUMENTS

| | | |
|---|---|---|
| 2006/0279256 A1 | 12/2006 | Bletsas |
| 2008/0200220 A1 | 8/2008 | Jackson |
| 2010/0241888 A1 | 9/2010 | Kaneko et al. |
| 2012/0235493 A1* | 9/2012 | Kiuchi ............... H01M 10/44 307/66 |
| 2014/0281608 A1 | 9/2014 | Yin et al. |
| 2015/0153810 A1 | 6/2015 | Sasidharan et al. |
| 2016/0098081 A1* | 4/2016 | Takahashi ........... A61B 5/681 340/5.51 |
| 2016/0353386 A1* | 12/2016 | Sasidharan ....... H04W 52/0264 |
| 2017/0139012 A1* | 5/2017 | Smith ................ G01R 31/3651 |
| 2017/0168555 A1* | 6/2017 | Munoz ................. G06F 1/3296 |

OTHER PUBLICATIONS

International Search Report and Written Opinion received for PCT Patent Application No. PCT/US2016/063688, dated Mar. 17, 2017, 13 pages.

* cited by examiner

*Primary Examiner* — Nitin C Patel

(57) ABSTRACT

Various embodiments are generally directed to an apparatus, method and other techniques to determine a threshold value of power for a fundamental function for a device, determine whether a current power level of a power source is equal to or less than the threshold value for the fundamental function. Further, and in response to determining the current power level is less than or equal to the threshold value, prohibit operation of an extended function, and in response to determining the current power level is not less than or equal to the threshold value, permit operation of the extended function.

25 Claims, 11 Drawing Sheets

System 100

400

```
┌─────────────────────────────────────────────────────┐
│ DETERMINE A THRESHOLD VALUE OF POWER FOR A FUNDAMENTAL │
│              FUNCTION FOR A DEVICE                   │
│                       405                            │
└─────────────────────────────────────────────────────┘
                          │
┌─────────────────────────────────────────────────────┐
│   DETERMINE WHETHER A CURRENT POWER LEVEL OF A POWER │
│  SOURCE IS EQUAL TO OR LESS THAN THE THRESHOLD VALUE FOR │
│               THE FUNDAMENTAL FUNCTION               │
│                       410                            │
└─────────────────────────────────────────────────────┘
                          │
┌─────────────────────────────────────────────────────┐
│  IN RESPONSE TO DETERMINING THE CURRENT POWER LEVEL IS LESS │
│   THAN OR EQUAL TO THE THRESHOLD VALUE, PROHIBIT OPERATION │
│                 OF AN EXTENDED FUNCTION              │
│                       415                            │
└─────────────────────────────────────────────────────┘
                          │
┌─────────────────────────────────────────────────────┐
│  IN RESPONSE TO DETERMINING THE CURRENT POWER LEVEL IS NOT │
│    LESS THAN OR EQUAL TO THE THRESHOLD VALUE, PERMIT │
│            OPERATION OF THE EXTENDED FUNCTION        │
│                       420                            │
└─────────────────────────────────────────────────────┘
```

*FIG. 4*

Storage Medium 500

Computer Executable
Instructions for 400

FIG. 5

TECHNIQUES TO MAINTAIN POWER FOR A FUNDAMENTAL FUNCTION ON A DEVICE

TECHNICAL FIELD

Embodiments described herein generally relate to techniques to ensure power to provide a fundamental function on a device.

BACKGROUND

Modern computing devices continue to evolve in variety of ways. One particular area in which computing devices have evolved is in the area of wearable computing devices that are becoming increasingly popular as stand-alone computing devices and as peripherals used in conjunction with other computing devices. Additionally, many modern computing devices may be embedded in common, everyday objects and include a plurality of devices and mechanisms interconnected in a network, such as "Internet of Things." These computing devices may provide various functionality all while operating from a power source, such as battery. Thus, these devices tend to use a great deal of power in a short amount of time. When power runs out the devices cease to operate, and in some instances, fail to provide functionality for its original intended use.

BRIEF DESCRIPTION OF THE DRAWINGS

FIG. 4 illustrates an example of a fifth logic flow diagram.
FIG. 5 illustrates an example storage medium.

DETAILED DESCRIPTION

Figure 1A:
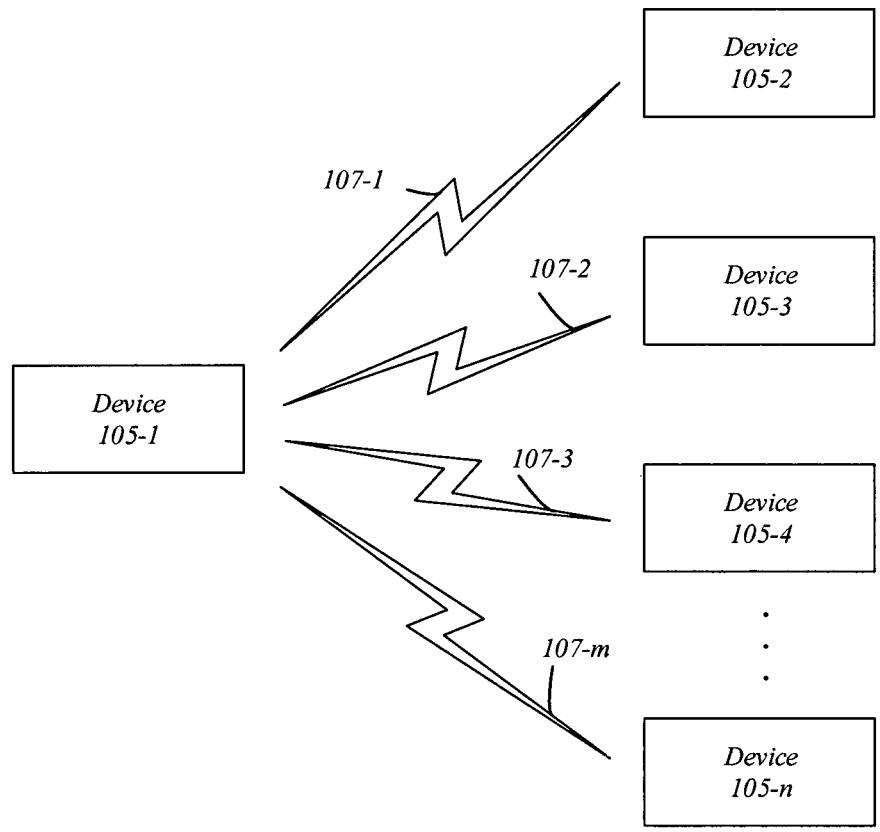
FIG. 1A illustrates an example first system.

An emerging trend in the consumer electronic device industry has been an increase in the amount of feature integration into a whole variety of existing devices. This trend is no better illustrated than in the wearable and IoT domains. Existing wearable and IoT items are getting 'intelligence' added to their existing form and making them into smart-devices (from watch to smart-watch, from necklace to smart-necklace, from lamp to smart-lamp, etc). Overall, feature integration has allowed these devices to become more useful by extending their capabilities to new usages. However, the addition of intelligence to these devices has degraded from their ability to meet their fundamental functional capability. For example, a watch cannot provide the time when the new logic added consumes all the battery life. There are no efforts to improve this problem of quickly using all the power of a power supply, and it has been widely accepted as the tradeoff associated with turning an item into a smart-device. Thus, various embodiments are directed to maintaining a minimum operational time for a fundamental function of device. The minimum operation time may be a determined amount of time for a device to operate while performing the fundamental function.

Embodiments may include performing a remaining power analysis to compare remaining power in a power supply to the needs of maintaining the fundamental function for a pre-determined amount of time. Upon completion of this analysis, the a device may allow the desired operations (extended functions) to execute or continue to execute unhindered, or inform the user that power is low and ask to proceed, or prevent the desired operation from continuing and inform user of power status.

In one particular example, the device may be a wearable smart watch, and the fundamental function may be to perform as a watch, e.g. provide time. The device may operate and provide time to a user until the user instantiates an action to indicate desire to access extended functions of the smart watch device. An example of these extended functions might be calendar viewing, receiving notifications for email, text messages, missed calls, voice mail, instant messages, and so forth. Currently, the request to provide the extended functions may continue unimpeded and without consideration to the remaining system power life. This could allow the device to consume all power and lose the ability to be perform its fundamental function, e.g. provide time.

Thus, embodiments include performing a remaining power check by determining a threshold value of power for the fundamental function for the device. The threshold value of power may be amount of power required to operate the fundamental function for the minimum operational time. In embodiments, the threshold value may be preloaded or stored in memory of a device by a manufacture, for example. In some embodiments, the threshold value may be calculated and determined based on a minimum operational time and power usage information for the fundamental function. Further, the power usage information may be the current power usage rate or an average power usage rate. Embodiments are not limited in this manner.

Embodiments may also include determining whether a current power level of the power source is equal to or less than the threshold value for the fundamental function. The determination may be made based on a comparison of the current power level of the power source and the threshold value. The current power level may be determined by polling the power source and/or a controller of the power source. Further and in response to determining the current power level is less than or equal to the threshold value, the device may prohibit operation of extended functions. However, in response to determining the current power level is not less than or equal to the threshold value, the device may permit operation of the extended functions. These and other details will become more apparent in the following description.

Various embodiments also relate to an apparatus or systems for performing these operations. This apparatus may be specially constructed for the purpose or it may include a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the method. The structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1A illustrates an example of a system 100 including a plurality of devices 105. The plurality of devices 105-$n$, where n may be any positive integer, may be any type of device and may communicate with each other via one or more wired and/or wireless links, such as communication links 107-$m$, where m may be any positive integer. In some instances, the devices 105 may part of a physical object that enables the object to communicate information and data with other objects in a network environment, such as an "Internet of Things" (IoT) over the communication links 107. The devices 105 may enable the object to be sensed and controlled remotely across an existing network. For example, a device 105 may be a door lock including circuitry to permit remote locking and unlocking functionality. In another example, a device 105 may be a thermostat and include circuitry to permit remote control of settings of the thermostat. In a third example, the device 105 may be light bulb that may include circuitry to allow for remote on and off control.

Further, in some embodiments, the device 105 may include a wearable object, known as "wearables," having circuitry to perform various functionality. For example, the device 105 may be a smart watch including circuitry to provide time. In another example, the device 105 may be a fitness tracker to provide and maintain biometric statistics of a user. In a third example, the device 105 may be smart glasses having circuitry to perform augmented reality processing, display message notifications, and so forth. In another example, the device 105 may be an emergency service pendant having circuitry to perform emergency service calls. Other examples of a wearable object may include a heart rate monitor, smart headphones, smart clothing, and so forth. Embodiments are not limited to these examples.

In embodiments, a device 105 may perform any number of functions. For example, a smartwatch may include circuitry to present a time of day and date to a user. The smartwatch may also enable a user to receive email message, text messages, instant messages, calendar events, tasks, fitness tracking, order a car service, and so forth. In another example, a door lock may provide lock and unlock functionality, along with a camera to view guest, a doorbell functionality, and so forth. Embodiments are not limited to these examples.

Further, a device 105 may include a fundamental function which may be the intended or original function for the device 105. In some embodiments, the fundamental function of a device 105 may preconfigured and provisioned at the time of manufacture. In the same and other embodiments, a user may be enabled to define the fundamental function for a device 105. For example, a user may be presented with a graphical user interface having various functions of a device 105 and a user may pick a function as the fundamental function for the device 105 via an input device.

One example fundamental function for a smartwatch may be providing a time to a user. In another example, the fundamental function for a door lock may be to lock and unlock a door. In a third example, the fundamental function of activity tracker may be monitoring activity and biometrics of a user. Embodiments are not limited to these examples, and the fundamental function may be the primary or core function of the device 105 based on the device type and the original use of the device 105.

A device 105 may also have one or more extended functions which may be additional functions other than the fundamental function. For example, an extended function for a smartwatch may be providing notifications for email, text messages, instant messages, events, tasks, and so forth. In another example, an extended function for a door lock may be providing camera capabilities for a user to see who is at a door. In a third example, an extended function for an activity tracker may be periodically communicating activity and biometric information to another device. Embodiments are not limited to these examples. Further, a device 105 may have more than one extended function. The smartwatch may provide notifications, while also performing a location determination, communicating information to another device, and so forth.

In some embodiments, the device 105 may execute the fundamental function and one or more extended functions while operating on a power source, such as a battery. These functions may use a considerable amount of power and quickly drain the battery making the device 105 inoperable until it is recharged. Running out of power may not be desirable for a user. Thus, a user may be willing to terminate or not use functionality, such as the extended functionality, to extend the operation life of the device 105 providing the fundamental functionality. As will become apparent in the following description, embodiments may be directed to controlling and providing the fundamental functionality for a minimum operational time for devices.

Figure 1B:
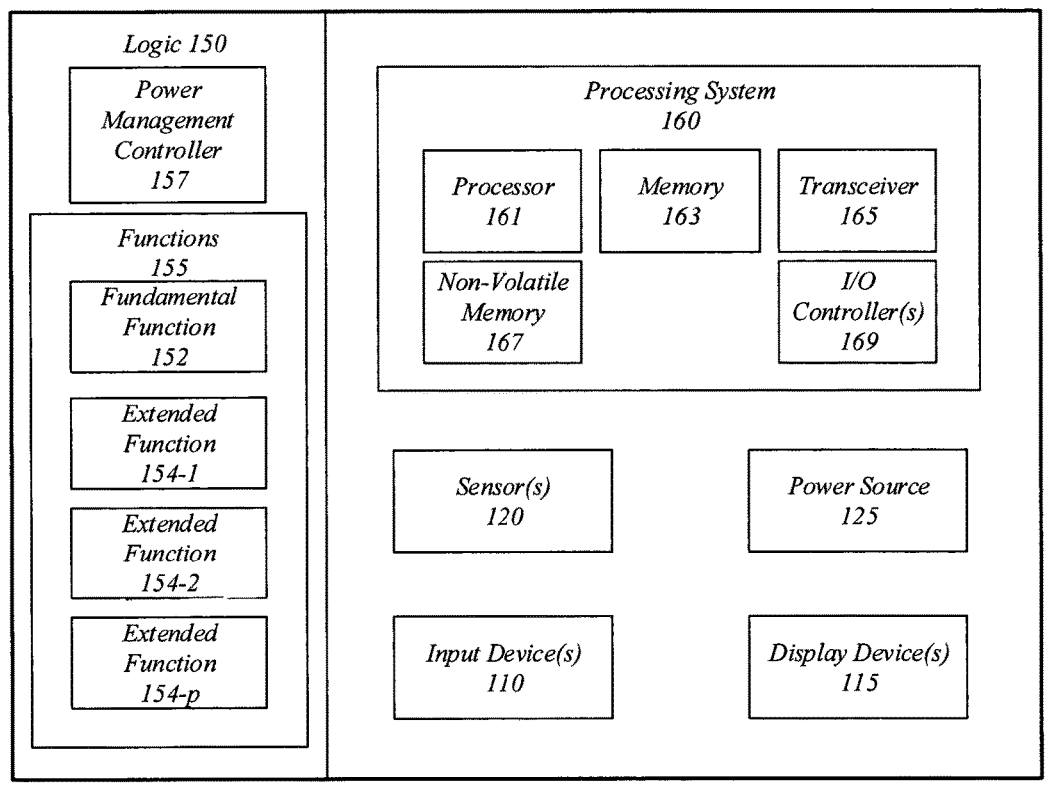
FIG. 1B illustrates an example second device.

FIG. 1B illustrates an example device 105, which may be the same as any of the devices previously discussed above or anywhere else within the specification. The device 105 may include a number of components and modules to perform various tasks and functions based on the device 105. The device 105 may include a processing system 160, which may be a system on chip (SoC) provided on an integrated circuit. The processing system 160 includes a processor 161, a memory 163, a transceiver 165, non-volatile memory 167, and one or more I/O controllers 169. Embodiments are not limited to these components and the processing system 160 may include other components.

The processing system 160 may include the processor 161 which may be one or more of any type of computational element, such as but not limited to, a microprocessor, a processor, central processing unit, digital signal processing unit, dual core processor, mobile device processor, desktop processor, single core processor, complex instruction set computing (CISC) microprocessor, a reduced instruction set (RISC) microprocessor, a very long instruction word (VLIW) microprocessor, or any other type of processor or processing circuit on a single chip or integrated circuit. In various embodiments, processing system 160 may include more than one processor.

The processing system 160 may include a memory 163 to couple to processor 161. Memory 163 may be coupled to processor 161 via an interconnect, or by a dedicated communications bus between processor 161 and memory 163, which may vary as desired for a given implementation. Memory unit 103 may be implemented using any machine-readable or computer-readable media capable of storing data, including both volatile and non-volatile memory. In some embodiments, the machine-readable or computer-readable medium may include a non-transitory computer-readable storage medium, for example. The embodiments are not limited in this context.

The memory 163 may store data momentarily, temporarily, or permanently. The memory 163 may store instructions and data for processing system 160. The memory 163 may also store temporary variables or other intermediate information while the processor 161 is executing instructions. The memory 163 is not limited to storing the above discussed data; the memory 163 may store any type of data.

In some embodiments, the processing system 160 includes a transceiver 165 which includes one or more components and circuitry to transmit and receive information using radio-frequency signals. More specifically, the transceiver 165 may include circuitry to produce radio-frequency mobile radio signals which are to be sent and for processing radio-frequency mobile radio signals which have been received. To this end, the transceiver 165 may be coupled to one or more antennas (not shown). The transmitted or received mobile radio signals are in one or more particular frequency ranges, which are typically prescribed by the mobile radio standard(s) supported by the radio-frequency assemblies. The transceiver 165 can include circuitry to process information according to one or more Institute of Electrical and Electronics Engineers (IEEE) standards, one or more peer-to-peer protocols, and so forth. For example, the transceiver 165 may be capable of communicate data in the 60 GHz frequency range in accordance with the IEEE Std 802.11ad-2012 standard, published Dec. 28, 2012, or any variant thereof. In some embodiments, the transceiver 165 may operate using one or more of Bluetooth® protocols and near field communication (NFC) protocols. Embodiments are not limited in this manner.

The processing system 160 may include non-volatile memory 167. Non-volatile memory 167 may be implemented as a non-volatile storage device such as, but not limited to, a magnetic disk drive, optical disk drive, tape drive, an internal storage device, an attached storage device, flash memory, battery backed-up synchronous dynamic random access memory (SDRAM), and/or a network accessible storage device. In embodiments, non-volatile memory 167 may include technology to increase the storage performance enhanced protection for valuable digital media when multiple hard drives are included, for example. In some embodiments, the non-volatile memory 167 may store information for the device, including a minimum operational time for a fundamental function, a threshold value or power to achieve the minimum operational time, power usage information for functions, and other information. Embodiments are not limited in this manner.

The processing system 160 includes one or more input/ouput (I/O) controllers 169 that may include Universal Serial Bus (USB) ports/adapters, IEEE 1394 Firewire ports/adapters, and so forth. The embodiments are not limited in this context. The I/O controllers 169 may manage and direct data and information between components of the processing system 160 and other components of the device 105. In some embodiments, the I/O controllers 169 may manage and direct data and information between the processing system 160 and components not part of device 105.

In some embodiments, the device 105 includes other components, such as one or more input devices 110, one or more display devices 115, one or more sensors 120, and a power source 125. Although these components are not illustrated as part of the processing system 160, embodiments are not limited in this manner. One or more of these components may be implemented as part of the processing system 160.

The input devices 110 may include any type of device in which a user can enter commands and information into the device 105 through one or more wired/wireless input devices. The input devices 110 may include a keyboard and a pointing device, such as a mouse. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing system 160 through one or more I/O controllers 169 that is coupled to a system bus, but can be connected by other interfaces such as a parallel port, IEEE 1394 serial port, a game port, a USB port, an IR interface, and so forth.

Device 105 including the display devices 115 may be any type of device to present information and data. The display devices 115 may include at least one of a Liquid Crystal Display (LCD), a Thin Film Transistor-LCD (TFT-LCD), an Organic Light Emitting Diode (OLED), a flexible display, a three-dimensional (3D) display, touchscreen and/or touch sensitive display and a projector, for example. The display devices 115 may display a User interface (UI) or a Graphical User Interface (GUI) associated with controlling functionality of the device 105 and one or more frames associated with a video output stream.

The device 105 may include one or more sensors 120 to detect events or changes in an environment. The sensors 120 may include an accelerometer to detect one or more motion inputs. More specifically, the accelerometer may convert sensed acceleration into an analog or digital value that represents the magnitude, and in some embodiments the sign (which of two opposite directions along the axis of measurement), of the sensed acceleration.

The sensors 120 may also include a camera to detect image information. More specifically the camera may include one or more sensors that turns light into discrete signals. The brighter the image at a given point on the sensors the larger the value that is read for that pixel.

The sensors 120 may also include a proximity sensor detect an object within a threshold distance without physical contact. In some embodiments, the proximity sensor may emit an electromagnetic field or a beam of electromagnetic radiation (infrared, for instance), and looks for changes in the field or return signal to detect the object. The proximity sensor may be any type of proximity sensor including a capacitive photoelectric sensor, an inductive proximity sensor, a capacitive displacement sensor, a Doppler effect sensor, an eddy-current sensor, an inductive sensor, a laser rangefinder sensor, a magnetic sensor, a passive optical sensor, a passive thermal sensor, a photocell sensor, a Radar sensor, a Sonar sensor, an ultrasonic sensor, or the like.

Embodiments are not limited to these examples and device 105 may include other sensors, such as one or more biometric sensors, a gyroscope, a magnetometer, light sensor, motion sensor, temperature sensor, chemical sensor, and so forth.

In embodiments, the device 105 may include a power source 125 which may be any device capable of supplying power for the device 105. The power source 125 may include any type of battery to store power for the computing device 105 including, but not limited to, a lithium ion battery, a nickel cadmium battery, zinc chloride battery, or the like. The battery may be rechargeable. In some embodiments, the battery may be removable. In other embodiments, the battery may be fixed.

The device 105 also includes logic 150, which may be implemented in hardware only, software only, or a combination of hardware and software. In some implementations, at least a portion of the logic 150 may be implemented as part of the processing system 160.

In embodiments, the logic 150 may include functions 155 and a power management controller 157. The functions 155 may include hardware and software instructions to provide any type of feature or capability for the device 105. The functions 155 provided may be based on the type of device 105 and one or more components of the device 105. Moreover, a function 155 may be a capability provided to a user based on operations performed by processing circuitry caused by one or more instructions stored in software and/or hardware of the devices. The instructions may cause the device 105 and one or more components to operate in a particular manner to achieve certain results. For example, the device 105 may be a smartwatch and a function may be providing and/or presenting a time of day on a display. This function may be caused by a number of instructions executing on the device 105. In another example, the device 105 may be an activity tracker and a function may be monitoring or tracking and storing a number of steps in memory, which may be performed by instructions executing on the device 105. Embodiments are not limited in this manner.

Further, the instructions 155 may include a fundamental function 152 and one or more extended function 154-1 through 154-p, where p may be any positive integer. The fundamental function 152 may be the core feature provided by the device 105 to the end user. As previously discussed, the fundamental function 152 of a smartwatch is to provide time. The fundamental function 152 of a phone is make and receive phone calls. The fundamental function 152 of a door is to lock and unlock a door, for example. Embodiments are not limited to these examples.

The fundamental function 152 may be defined by a user of the device 105 or provisioned by a manufacture of the device 105. In some instances, the fundamental function 152 may be provisioned by the manufacture which may be redefined by a user. The fundamental function 152 for the device 105 may be identified and stored in memory, such as non-volatile memory 167 for use by the power management controller 157 when performing power management. For example, the non-volatile memory 167 may store an identifier for the fundamental function 152 and indications of hardware and/or software required to support and provide the fundamental function 152.

In some instances, additional information for the fundamental function 152 may be stored in the non-volatile memory 167. For example, the non-volatile memory 167 may store a minimum operational time for the fundamental function 152. The minimum operational time can be defined by a manufacture and/or by a user and may be an amount of time to provide operation of the fundamental function 152 before a recharge is required. The minimum operational time may be in a format using days, hours, minutes, seconds, and so forth. The non-volatile memory 167 may also store power usage data for the fundamental function 152. The power usage data may include information indicating an average amount of power (Watts) used during a time period. For example, the power usage data may indicate that the fundamental function 152 uses an amount of power in amp-h or watt-h. For example, a power source may be capable of having 200 mW-h. Thus, in this example, the power source is capable of delivering 200 mW for one hour or a lower power for a longer duration. For example, a function (fundamental or extended) may consume 1 mW, and in this example, will operate for 200 hours. Embodiments are not limited to this example.

In some embodiments, the non-volatile memory 167 may store an amount of power (battery) to reserve for the fundamental function 152 to achieve the minimum operational time. The amount may be based on the minimum operational time and the power usage data. In some instances, this information (minimum operational time, power usage data, and amount of power) may be configured and stored in the non-volatile memory 167 at the time of manufacture. However, embodiments are not limited in this manner and the information may be set and/or reconfigured by a user of the device 105.

The logic 150 may also include one or more extended functions 154 for the device 105. These extended functions 154 include features in addition to the fundamental function 152. The extended functions 154 may be implemented in as number of instructions stored in hardware and/or software which may cause the device 105 to operate in a certain manner to provide features. Similar, to the fundamental function 152, information, such as an identification and power usage data, for each extended function 154 may be stored in memory, such as the non-volatile memory 167. This information may be used by the power management controller 157 when performing power management operations. For example, information identifying hardware and software used to perform the extended functions 154 may be used to prohibit or terminate extended functions 154. Embodiments are not limited in this manner.

The logic 150 may also include the power management controller 157 to control various aspects of the functionality for the device 105. The power management controller 157 may determine whether to prohibit and/or terminate one or more extended functions 154. The power management controller 157 may determine and monitor a power level for the power source 125. In some embodiments, the power management controller 157 may enable a user to update various settings including a minimum operational time for a fundamental function 152. Similarly, the power management controller 157 may enable a user to configure or reconfigure the fundamental function for the device 105.

The power management controller 157 can be implemented as instructions that may be processed by the processing system 160, and in particular, the processor 161. These instructions may be stored in non-volatile memory 167 and executed by the processor 161, for example. In some embodiments, the power management controller 157 may be a separate and dedicate processing device including hardware, such as registers, gates, adders, transistors, and so forth. The device may be a SoC, an embedded controller, or a power management integrated circuit device. The instructions may be used to perform various operations discussed herein, including those discussed below in the logic flows of FIGS. 2A-2D. Embodiments are not limited in this manner.

Figure 2A:
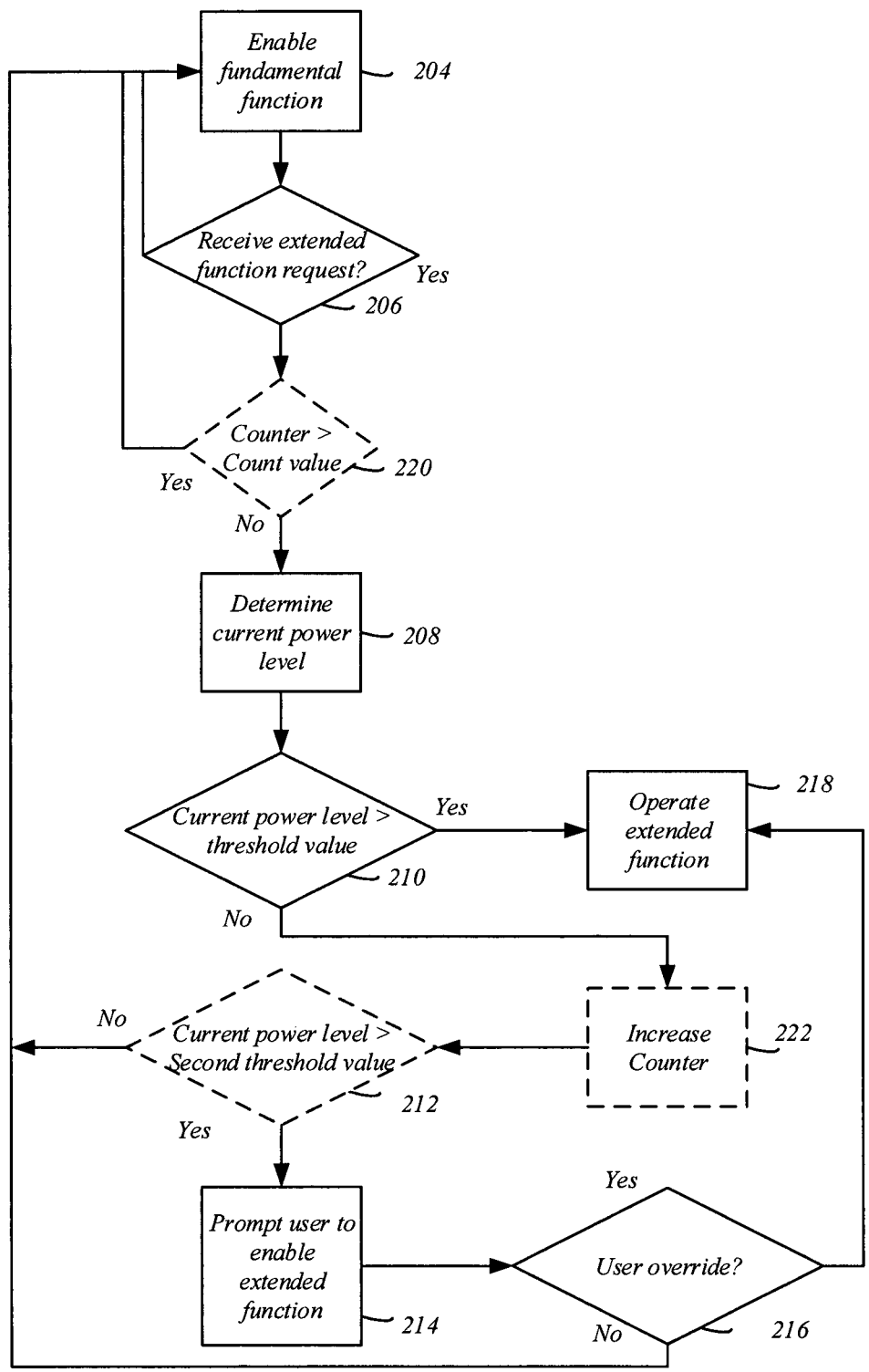
FIG. 2A illustrates an example of a first logic flow diagram.

FIG. 2A illustrates a first logic flow 200 which may be implemented by device 105 including the power management controller 157. As shown in FIG. 2A, the logic flow 200 includes a number of blocks which may be performed by the systems discussed herein. Although, FIG. 2A illustrates these blocks occurring in particular order, embodiments are not so limited and certain blocks may occur prior to or subsequent other blocks.

At block 204, the fundamental function of a device may be enabled and put into an operational state. Enabling and putting the fundamental function into an operational state may occur when the device is first initiated or turned on (power is applied), for example. The fundamental function may be the core function for the device and include instructions processed by a processor to provide the core function. In some instances, the fundamental function may be set, configured, and provisioned at the time of manufacture. However, in some instances, the fundamental function may be set by a user of the device. The device may continue to operate providing the fundamental function to a user.

At decision block 206, a determination may be made as to whether one or more extended functions have been requested. The determination may be made on a periodic, semi-periodic, or non-periodic basis. In some instances, the determination may be triggered via a user input or selection and an extended function may be any function other than the fundamental function. For example, a user may interact with the device via a GUI and make a selection to invoke a function on the device. However, embodiments are not limited in this manner, and in some instances, a request to invoke an extended function may occur automatically on a device without user interaction. For example, a device, such as a smartwatch, may periodically provide notifications to a user. This function may occur without a user requesting the function.

If at decision block 206, a request to invoke an extended function has not been received, the device may continue to perform the fundamental function without interruption. If at decision block 206, a request to invoke an extended function was received, a current power level for a power source for the device may be determined at block 208. More specifically, the remaining power in a power source, such as a battery, may be determined. In one example, the battery and/or a battery controller may be polled to determine the amount of power remaining and may be an amount of mW-h power left in the power source.

At decision block 210, a determination may be made as to whether the current power level is greater than a threshold value. Note that the reverse calculation (current power level less than the threshold value) with reverse logic may be used in the determination and embodiments are not limited in this manner. The threshold value may be an amount of power required to enable the fundamental function to operate for a minimum operational time. The threshold value may be calculated or determined based the minimum operational time and current power usage data for the fundamental function. As previously mentioned, the minimum operational time may be configured by a manufacture or a user of a device. The current usage data may be determined by the device. For example, real-time calculations may be performed to determine the current power usage. In some instances, an average current power usage may be tracked and determined. Embodiments are not limited in this manner. In some instances, the power data usage and threshold value may be predetermined by the manufacture and amount of power may be allocated at the time of manufacture such that the fundamental function will operate for the desired operation time.

If at decision block 210, the current power level is greater than the threshold value, the operation of the extended function is enabled and at block 218, the extended function is put in an operational state. If at decision block 210, the current power level is not greater than the threshold value, the extended function may be prohibited from operating. In some embodiments, at optional block 212, a determination may be made as to whether the current power level is greater than a second threshold value, where the second threshold value is a lower power level relative to the threshold value used in decision block 210. Thus, the threshold value may be a low power value and the second threshold value may be a lower power value relative to the threshold value. The second threshold value may be used to determine whether to permit or not permit a user to override the prohibition of the extended function. In some embodiments, the determination at optional block 212 may not be made and the flow may proceed directly to block 214.

If the current power level is less than the second threshold value, the extended function may not be permitted to operate even if a user desires to override the prohibition. However, if the current power level is greater than the second threshold value, a a user may be prompted to manually enable the extended function and override the prohibition at block 214. If the user overrides the prohibition of the extended function at decision block 216, the extended function may be allowed to operate at block 218. However, if the user does not override the prohibition of the extended function, the extended function will not be put into an operational state. Note that blocks 212 and 214 may be optional, and in some instances, if the current power is not greater than the threshold value the extended functional will not be permitted to operate and a user will not be prompted to override the prohibition.

In some embodiments, the logic flow 200 may include a counter at block 222 that increases (or decreases based on logic) to limit a number of times a user may attempt to override the prohibition of the extended function. Thus, a counter may increase by one, for example, and when the counter is greater than (or less than based on logic) a counter value at optional decision block 220, blocks 208-218 may not execute. The counter may reset (not shown) once the power supply is charged above the first threshold value, for example. This may limit the number of attempts a user can override the prohibition of an extended function.

Figure 2B:
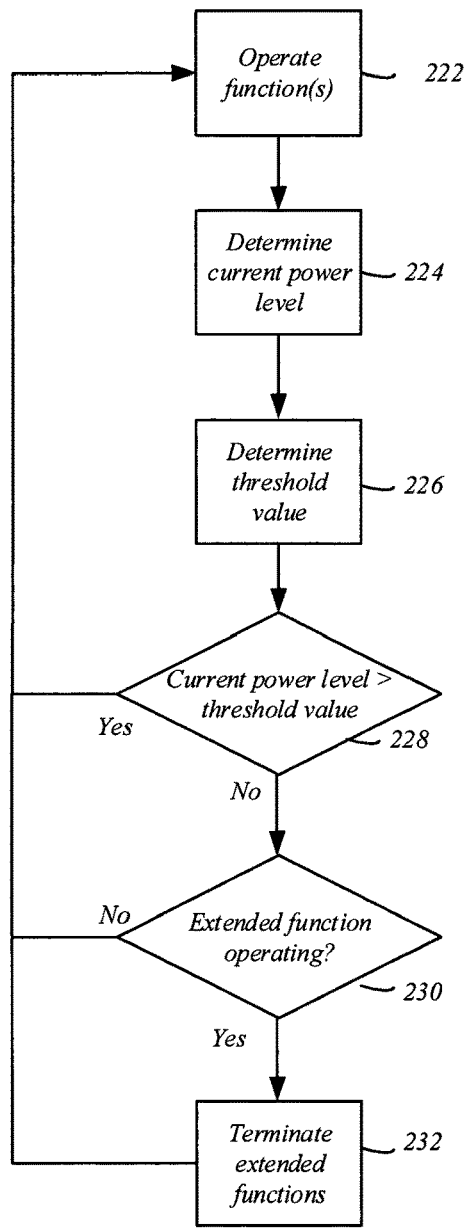
FIG. 2B illustrates an example of a second logic flow diagram.

FIG. 2B illustrates a second logic flow 220 which may be implemented by device 105 including the power management controller 157. As shown in FIG. 2B, the logic flow 220 includes a number of blocks which may be performed by the systems discussed herein. Although, FIG. 2B illustrates these blocks occurring in particular order, embodiments are not so limited and certain blocks may occur prior to or subsequent other blocks.

At block 222, one or more functions may operate on a device. These functions may include the fundamental function of the device and one or more extended functions for the device. At block 224, a determination for the current power level in a power source may be made. For example, a battery or battery controller may be polled to determine an amount of power left in the battery. In some instances, the amount of power may be in mW-h. The determination at block 224 may occur periodically, semi-periodically, or non-periodically. At block 226, a threshold value for the fundamental function may be determined. For example, the threshold value may be stored and retrieved from memory, such as non-volatile memory, and indicate an amount of power required to operate the fundamental function for a minimum operational time that may be determined by a user or a manufacture.

At decision block 228, a determination may be made as to whether the current power level is greater than the threshold value. Note that the reverse calculation and logic may be performed to achieve similar results, e.g. determining whether the current power level is less than (or equal) to the threshold value. If at decision block 228, the current power level is greater than the threshold value, the functions including the fundamental function and any number of extended functions may be permitted to continue to operate. If at decision block 228, the current power level is less than (or equal) to the threshold value, a determination may be made as to whether any extended functions are currently operating on the device at decision block 230.

If at decision block 230, no extended functions are operating on the device, the fundamental function may be permitted to continue to operate uninterrupted. However, if one or more extended functions are operating on the device, the one or more (all) of the extended functions may be terminated to ensure that the fundamental function will operate for at least the minimum operational time at block 232. In terminating the extended functions, operation of associated hardware and software may be terminated. Only hardware and software required to support and execute the fundamental function may be permitted to operate, for example. In some instances and as similarly discussed in logic flow 200, prior to terminating the extended functions are user may be prompted and enabled to override the termination of the extended functions. Thus, a user may choose not to terminate the extended functions, but allow them to operate possibly reducing the operational time for the fundamental function below the minimum operational time. Once the extended functions are terminated or the termination is overridden, the fundamental function may continue to operate for the device.

Figure 2C:
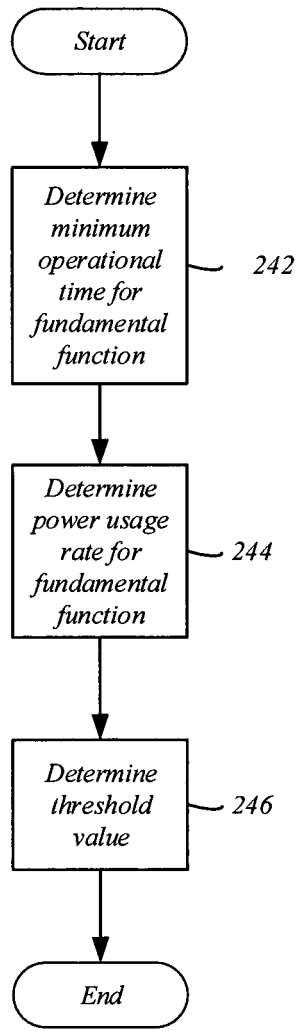
FIG. 2C illustrates an example of a third logic flow diagram.

FIG. 2C illustrates a third logic flow 240 which may be implemented by device 105 including the power management controller 157. As shown in FIG. 2C, the logic flow 240 includes a number of blocks which may be performed by the systems discussed herein. Although, FIG. 2C illustrates these blocks occurring in particular order, embodiments are not so limited and certain blocks may occur prior to or subsequent other blocks.

In some embodiments, the logic flow 240 may be used to determine a threshold value to enable the fundamental function to operate for a minimum operational time. As previously mentioned, the minimum operational time may be determined and set at the time of manufacture or by a user. To determine the threshold value, at block 242, the minimum operational time may be determined. For example, the minimum operational time may be predetermined or set value stored in memory, such as non-volatile memory. Thus, the minimum operational time may be retrieved or received from the memory and used to determine the threshold value.

At block 244, the power usage for the fundamental function may be determined. The power usage may be a value calculated and stored in the memory. In embodiments, the power usage may be an average or moving average value determined by monitoring the power usage of the fundamental function in operation. The power usage may be updated in real-time on a continuous, semi-continuous, periodic, semi-periodic, and/or non-periodic basis. Embodiments are not limited in this manner. The power usage may indicate an amount of power required to perform the fundamental function, e.g. mW.

At block 246, the threshold value for the fundamental function may be determined. For example, the minimum operational time may be multiplied by the power usage to determine a total amount of power (threshold value) required to ensure the fundamental function will operate for the minimum operational time. For example, if the power usage of a fundamental functions is 1 mW and the minimum operational time is 24 hours, the threshold value may be 24 mW-h. Embodiments are not limited to this example and as previously mentioned, the threshold value may be used to determine whether to allow extended functions to operate or continue to operate on a device.

Figure 2D:
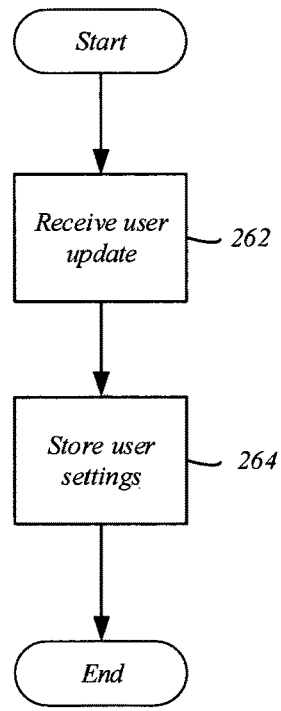
FIG. 2D illustrates an example of a fourth logic flow diagram.

FIG. 2D illustrates a fourth logic flow 260 which may be implemented by device 105 including the power management controller 157. As shown in FIG. 2D, the logic flow 260 includes a number of blocks which may be performed by the systems discussed herein. Although, FIG. 2D illustrates these blocks occurring in particular order, embodiments are not so limited and certain blocks may occur prior to or subsequent other blocks.

As previously mentioned, a user may update one or more settings or configurations for a device, including the fundamental function of the device and the minimum operational time. However, in some embodiments are user may not be permitted to adjust or change these settings. Logic flow 260 is directed towards the case when a user is permitted to change settings.

At block 262, an update to a setting or configuration may be received on a device. For example, a user may make a selection, via an input device, to change the fundamental function of the device or a minimum operational time for the fundamental function. In changing the fundamental function, the user may be presented a list of all the functions supported by the device and a user may select or choose one of the functions as the fundamental function. Thus, when a current power level falls below a threshold value, as previously discussed, whichever fundamental function enabled by a user may continue to run while other functions (extended functions) may be terminated.

The user may also change or adjust the minimum operational time. For example, a user may be presented with a GUI to adjust the time. Embodiments are not limited to these examples and the user may be enabled to adjust other settings for the device, such as the threshold value. At block 264, the updated settings and/or configuration may be stored in the memory for later use.

Figure 3:
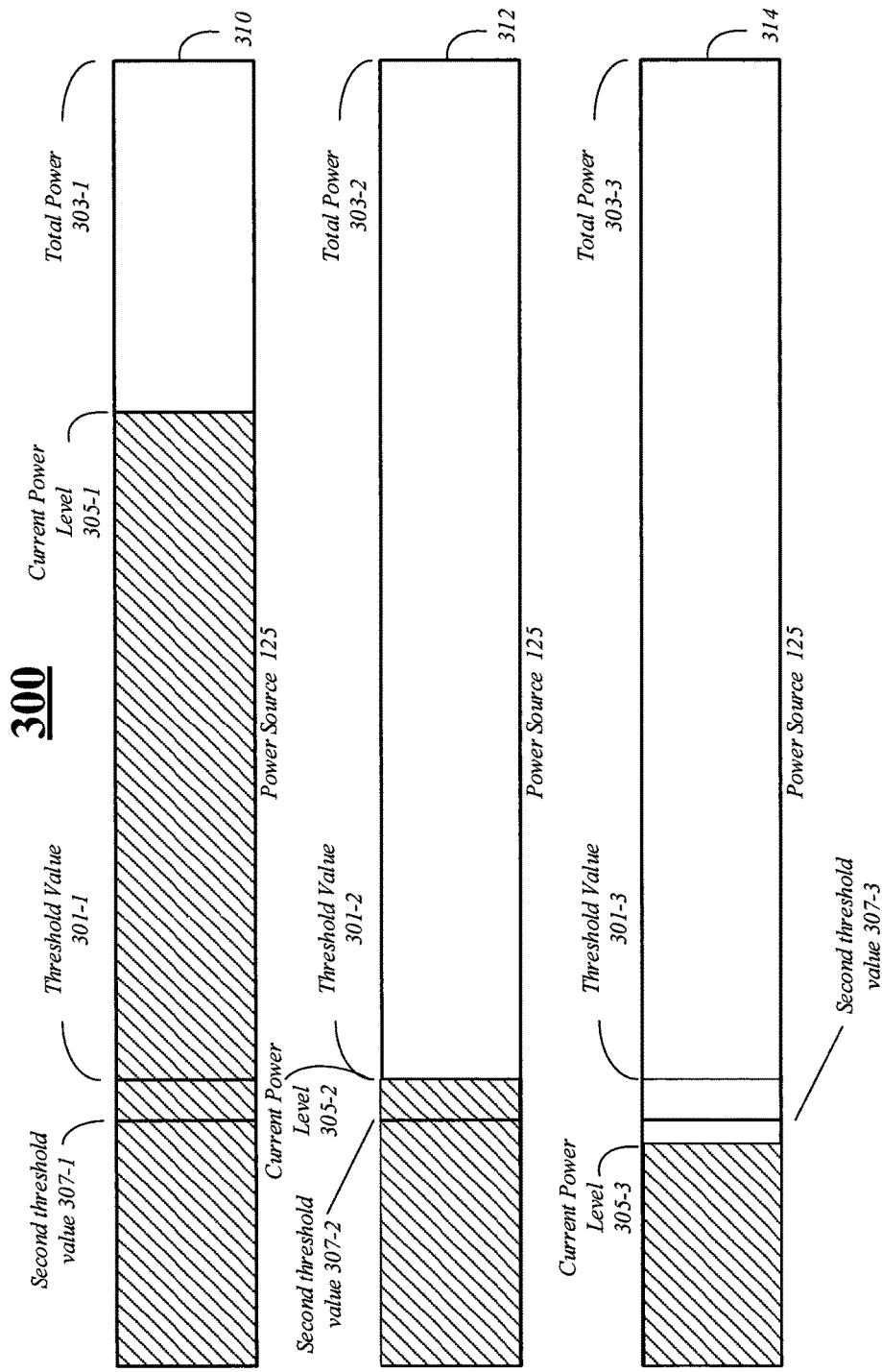
FIG. 3 illustrates examples of power levels for a power source.

FIG. 3 illustrates examples of various power source levels in diagram 300. As can be appreciate, the power level of a power source, such as power source 125 of device 105, may have different levels of power remaining at any given point in time. FIG. 3 illustrates snapshots of the same power source 125 at three different power levels. Embodiments are not limited in this manner.

In the first power level chart 310, the current power level 305-1 is greater than the threshold value 301-1, but less than the total power 303-1 capable of being stored by the power source 125. Thus, one or more extended functions may be permitted to operate and/or continue to operate in addition to the fundamental function. Note that the current power level 305-1 is also greater than the second threshold value 307-1, where the second threshold value 307-1 may be a lower amount of power than the threshold value.

In the second power level chart 312, the current power level 305-2 is equal to the threshold value 301-2 and greater than the second threshold value 307-2. When the current power level 305-2 equals the threshold value 301-2, one or more extended functions may be terminated to ensure that the fundamental function is capable for operating for at least the minimum operational time before requiring a recharge of the power source. In addition, any extended functions attempting to be invoked will not be permitted to operate unless a user overrides the prohibition of operation. Note that if the prohibition of the extended function(s) is overridden by a user, the fundamental function may not operate for the minimum operational time.

In the third power level chart 314, the current power level 305-3 is less to the threshold value 301-3 and the second threshold value 307-3. When the current power level 305-3 is less than both threshold values 301-7 and 307-3, extended functions may not be permitted to operate until the power source is recharged.

In some instances, when the power level 305 is between the first threshold value 301 and the second threshold value 307 the extended function should not be operating on the device unless a user has previously overridden the prohibition of the extended functions. In this case, the extended functions may be permitted to continue to operate. In embodiments, when extended functions are operating below the threshold value, a user may be prompted on a periodic or semi-periodic basis as to whether he/she would like for the extended functions to continue operate. The prompt may include an indication that the fundamental function will not operate for the minimum operational time and, in some cases, may provide an estimate total amount of operational time remaining for the fundamental function based on current power usages information. Further, any extended functions attempting to be invoked will not be permitted to operate unless a user overrides the prohibition of operation. Embodiments are not limited in this manner, and in some embodiments a user may not be permitted to override prohibition of extended functions.

FIG. 4 illustrates an example fifth logic flow 400. As shown in FIG. 4 the logic flow 400 may be performed by one or more elements of device 105. However, embodiments are not limited in this manner.

The logic flow 400 includes determining a threshold value of power for a fundamental function for a device at block 405. The threshold value of power may be amount of power required to operate a fundamental function for a minimum operational time. In embodiments, the threshold value may be preloaded or stored in memory of a device by a manufacture, for example. In some embodiments, the threshold value may be calculated and determined based on a minimum operational time and a power usage rate for the fundamental function. Further, the power usage rate may be the current power usage rate or an average power usage rate. Embodiments are not limited in this manner.

At block 410, the logic flow includes determining whether a current power level of a power source is equal to or less than the threshold value for the fundamental function. The determination may be made based on a comparison of the current power level of the power source and the threshold value. The current power level may be determined by polling the power source and/or a controller of the power source. The threshold value can be determined based on a power usage rate (current or average) for the fundamental function and the minimum operational time. In some embodiments, the threshold value may be predetermined and stored in memory by the manufacture. More specifically, the threshold value may indicate an amount of power to reserve for the fundamental function based historical power usage data indicating a known average power usage for the fundamental function. In some embodiments, the device may be preloaded with a list of power usage data indicating known average power usage and a required power level to maintain a minimum operational time for each function. Embodiments are not limited in this manner.

The logic flow 400 may include in response to determining the current power level is less than or equal to the threshold value, prohibit operation of an extended function at block 415. For example, if a request to enable an extended function is received, the extended function may be prohibited from executed. Similarly, if one or more extended functions operating of the device, they may be terminated.

At block 420, the logic flow 400 may include in response to determining the current power level is not less than or equal to the threshold value, permit operation of the extended function. For example, if a request to enable an extended function is received, the extended may be permitted to execute. Further, one or more extended functions may continue to operate on the device.

FIG. 5 illustrates an example of a first storage medium. As shown in FIG. 5, the first storage medium includes a storage medium 500. The storage medium 500 may comprise an article of manufacture. In some examples, storage medium 500 may include any non-transitory computer readable medium or machine readable medium, such as an optical, magnetic or semiconductor storage. Storage medium 500 may store various types of computer executable instructions, such as instructions to implement logic flows 200, 220, 240, 260, and 400. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 6:
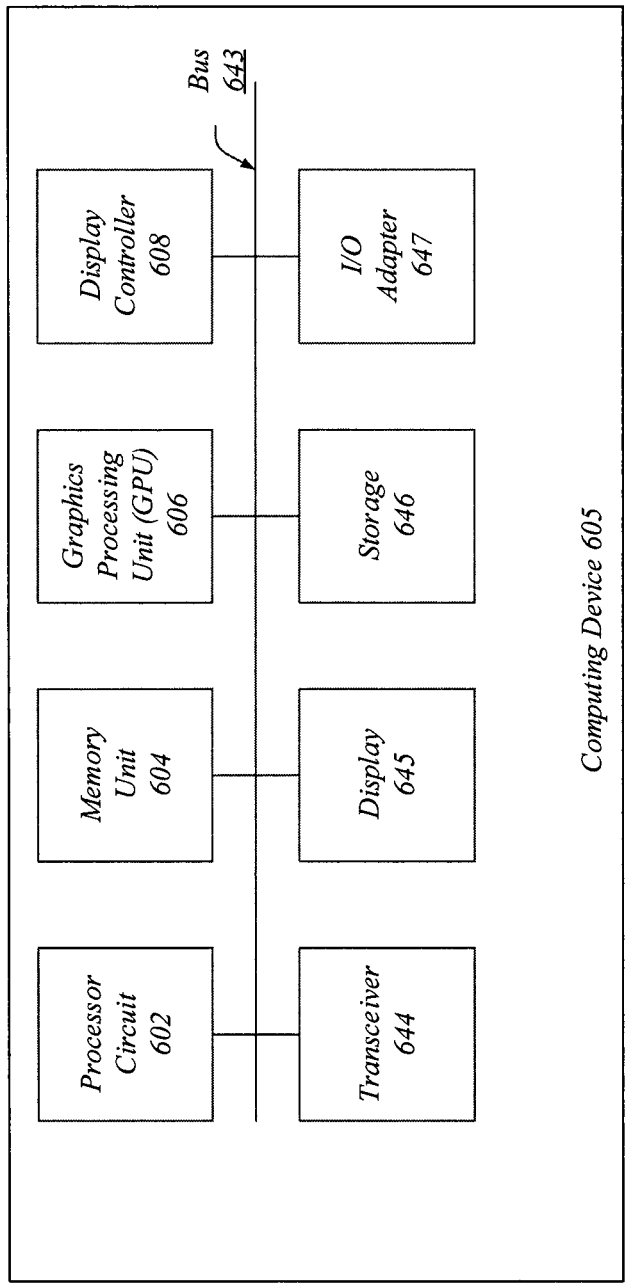
FIG. 6 illustrates an example system.

FIG. 6 illustrates one embodiment of a system 600. In various embodiments, system 600 may be representative of a system or architecture suitable for use with one or more embodiments described herein. The embodiments are not limited in this respect.

As shown in FIG. 6, system 600 may include multiple elements. One or more elements may be implemented using one or more circuits, components, registers, processors, software subroutines, modules, or any combination thereof, as desired for a given set of design or performance constraints. Although FIG. 6 shows a limited number of elements in a certain topology by way of example, it can be appreciated that more or less elements in any suitable topology may be used in system 600 as desired for a given implementation. The embodiments are not limited in this context.

In various embodiments, system 600 may include a computing device 605 which may be any type of computer or processing device including a personal computer, desktop computer, tablet computer, netbook computer, notebook computer, laptop computer, server, server farm, blade server, or any other type of server, and so forth.

In various embodiments, computing device 605 may include processor circuit 602. Processor circuit 602 may be implemented using any processor or logic device. The processing circuit 602 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The processing circuit 602 may be connected to and communicate with the other elements of the computing system via an interconnect 643, such as one or more buses, control lines, and data lines.

In one embodiment, computing device 605 may include a memory unit 604 to couple to processor circuit 602. Memory unit 604 may be coupled to processor circuit 602 via communications bus 643, or by a dedicated communications bus between processor circuit 602 and memory unit 604, as desired for a given implementation. Memory unit 604 may be implemented using any machine-readable or computer-readable media capable of storing data, including both volatile and non-volatile memory. In some embodiments, the machine-readable or computer-readable medium may include a non-transitory medium. The embodiments are not limited in this context. In some embodiments, memory 108 may be the same as memory unit 604.

Computing device 605 may include a graphics processing unit (GPU) 606, in various embodiments. The GPU 606 may include any processing unit, logic or circuitry optimized to perform graphics-related operations as well as the video decoder engines and the frame correlation engines. The GPU 606 may be used to render 2-dimensional (2-D) and/or 3-dimensional (3-D) images for various applications such as video games, graphics, computer-aided design (CAD), simulation and visualization tools, imaging, etc. Various embodiments are not limited in this manner; GPU 606 may process any type of graphics data such as pictures, videos, programs, animation, 3D, 2D, objects images and so forth.

In some embodiments, computing device 605 may include a display controller 608. Display controller 608 may be any type of processor, controller, circuit, logic, and so forth for processing graphics information and displaying the graphics information. The display controller 608 may receive or retrieve graphics information from one or more buffers. After processing the information, the display controller 608 may send the graphics information to a display.

In various embodiments, system 600 may include a transceiver 644. Transceiver 644 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. It may also include a transceiver for wired networking which may include (but are not limited to) Ethernet, Packet Optical Networks, (data center) network fabric, etc. In communicating across such networks, transceiver 644 may operate in accordance with one or more applicable standards in any version. The embodiments are not limited in this context.

In various embodiments, computing device 605 may include a display 645. Display 645 may constitute any display device capable of displaying information received from processor circuit 602, graphics processing unit 606 and display controller 608.

In various embodiments, computing device 605 may include storage 646. Storage 646 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 646 may include technology to increase the storage performance enhanced protection for valuable digital media when multiple hard drives are included, for example. Further examples of storage 646 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, computing device 605 may include one or more I/O adapters 647. Examples of I/O adapters 647 may include Universal Serial Bus (USB) ports/adapters, IEEE 1394 Firewire ports/adapters, and so forth. The embodiments are not limited in this context.

Figure 7:
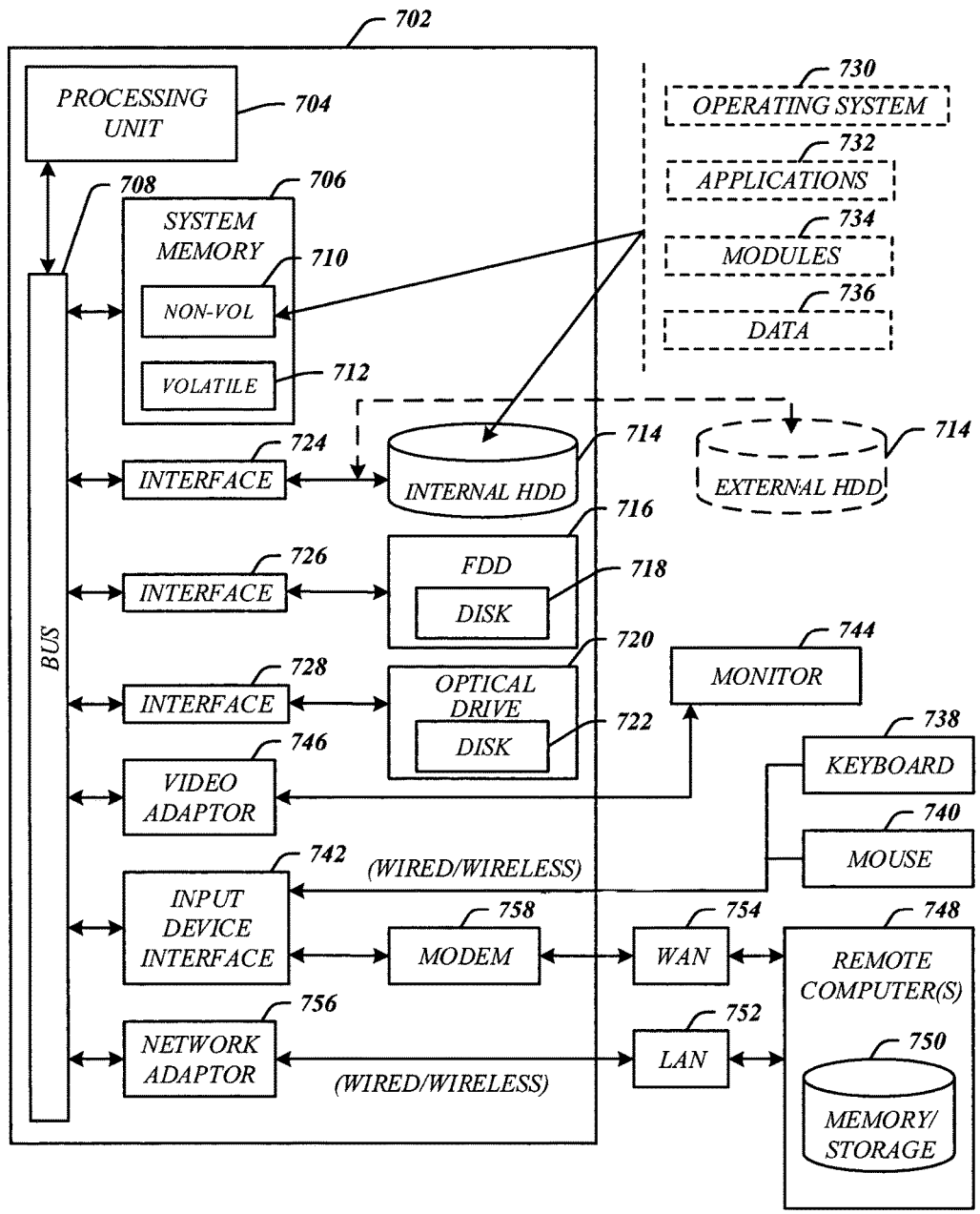
FIG. 7 illustrates an example computing architecture.

FIG. 7 illustrates an embodiment of an exemplary computing architecture 700 suitable for implementing various embodiments as previously described. In one embodiment, the computing architecture 700 may comprise or be implemented as part of system 100 and computing device 105.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chip-sets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, such as those described with reference to the processor component 102 shown in FIG. 1.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 105.

A user can enter commands and information into the computer 702 through one or more wired/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wired and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wired/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least WiFi (or Wireless Fidelity), WiMax, and Bluetooth™ wireless technologies, 3G, 4G, LTE wireless technologies, among others. Thus, the communication can be a predefined structure as with a conventional network or simply an ad hoc communication between at least two devices. WiFi networks use radio technologies called IEEE 802.11x (a, b, g, n, etc.) to provide secure, reliable, fast wireless connectivity. A WiFi network can be used to connect computers to each other, to the Internet, and to wire networks (which use IEEE 802.3-related media and functions).

The various elements of the computing systems as previously described with reference to FIGS. 1-7 may comprise various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through twenty-five (1-25) provided below are intended to be exemplary and non-limiting.

In a first example, a system, device, apparatus may include a memory and a processor coupled with the memory. The processor to compare a current power level of a power source to the threshold value for the fundamental function, in response to determining that the current power level is less than the threshold value, prohibit operation of an extended function, and in response to determining that the current power level is greater than the threshold value, permit operation of the extended function.

In a second example and in furtherance of the first example, a system, device, apparatus may include the processor to determine the fundamental function for the device based on a user setting or a provisioned setting, the fundamental function to comprise a default state for the device.

In a third example and in furtherance of any previous example, a system, device, apparatus may include the processor to determine the threshold value for the fundamental function based on a user setting or a provisioned setting.

In a fourth example and in furtherance of any previous example, a system, device, apparatus may include the threshold value comprising a minimum amount of power to maintain operation of the fundamental function for a minimum operation time, the minimum operation time based on a user setting or a provisioned setting.

In a fifth example and in furtherance of any previous example, a system, device, apparatus may include detect a power level of the power source below the threshold value and in response to the detection, terminate operation of one or more extended functions operating on the device.

In a sixth example and in furtherance of any previous example, a system, device, apparatus may include terminate execution of one or more instructions for the one or more extended functions and cause one or more hardware components associated with the one or more extended functions to enter a lower power state.

In a seventh example and in furtherance of any previous example, a system, device, apparatus may include the processor to receive a request to enable the extended function for the device via a user input.

In an eighth example and in furtherance of any previous example, a system, device, apparatus may include the processor to enable a user to override the prohibition of the operation of the extended function via a prompt for a selection.

In a ninth example and in furtherance of any previous example, a system, device, apparatus may include a system on chip (SoC) comprising the processor, the memory, the power source, and an input/output (I/O) interface coupled with an input device.

In a tenth example and in furtherance of any previous example, a method may include comparing a current power level of a power source to the threshold value for the fundamental function, in response to determining that the current power level greater than the threshold value, permit operation of an extended function, and in response to determining that the current power level is less than the threshold value, prohibit operation of the extended function.

In an eleventh example and in furtherance of any previous example, a method may include determining the fundamental function for the device based on a user setting or a provisioned setting, the fundamental function comprising a core function for the device.

In a twelfth example and in furtherance of any previous example, a method may include the threshold value comprising a minimum amount of power to maintain operation of the fundamental function for a desired operation time, the desired operation time based on a user setting or a provisioned setting.

In a thirteenth example and in furtherance of any previous example, a method may include the threshold value comprising a minimum amount of power to maintain operation of the fundamental function for a desired operation time, the desired operation time based on a user setting or a provisioned setting.

In a fourteenth example and in furtherance of any previous example, a method may include detecting a power level of the power source below the threshold value and in response to detecting, terminating operation of the extended function on the device.

In a fifteenth example and in furtherance of any previous example, a method may include terminating execution of one or more instructions for the one or more extended functions and causing one or more hardware components associated with the one the or more extended functions to enter a lower power state.

In a sixteenth example and in furtherance of any previous example, a method may include receiving a request to enable the extended function for the device via a user input.

In a seventeenth example and in furtherance of any previous example, a method may include enabling a user to override the prohibition of the operation of the extended function via a prompt for a selection.

In an eighteenth example and in furtherance of any previous example, a computer-readable storage medium comprising a plurality of instructions that, when executed by processing circuitry, enable the processing circuitry to compare a current power level of a power source to the threshold value for the fundamental function, in response to determining that the current power level is less than the threshold value, prohibit operation of an extended function, and in response to determining that the current power level is greater than the threshold value, permit operation of the extended function.

In a nineteenth example and in furtherance of any previous example, a computer-readable storage medium comprising a plurality of instructions that, when executed by processing circuitry, enable the processing circuitry to determine the fundamental function for the device based on a user setting or a provisioned setting, the fundamental function comprising a core function for the device.

In a twentieth example and in furtherance of any previous example, a computer-readable storage medium comprising a plurality of instructions that, when executed by processing circuitry, enable the processing circuitry to determine the threshold value for the fundamental function based on a user setting or a provisioned setting.

In a twenty-first example and in furtherance of any previous example, a computer-readable storage medium comprising a plurality of instructions that, when executed by processing circuitry, enable the processing circuitry to the threshold value comprising a minimum amount of power to maintain operation of the fundamental function for a desired operation time, the desired operation time based on a user setting or a provisioned setting.

In a twenty-second example and in furtherance of any previous example, a computer-readable storage medium comprising a plurality of instructions that, when executed by processing circuitry, enable the processing circuitry to detect a power level of the power source below the threshold value and in response to the detection, terminate operation of one or more extended functions operating on the device.

In a twenty-third example and in furtherance of any previous example, a computer-readable storage medium comprising a plurality of instructions that, when executed by processing circuitry, enable the processing circuitry to terminate execution of one or more instructions for the one or more extended functions and cause one or more hardware components associated with the one the or more extended functions to enter a lower power state.

In a twenty-fourth example and in furtherance of any previous example, a computer-readable storage medium comprising a plurality of instructions that, when executed by processing circuitry, enable the processing circuitry to receive a request to enable the extended function for the device via a user input.

In a twenty-fifth example and in furtherance of any previous example, a computer-readable storage medium comprising a plurality of instructions that, when executed by processing circuitry, enable the processing circuitry to enable a user to override the prohibition of the operation of the extended function via a prompt for a selection or via a user setting.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   a processor; and
   a memory coupled to the processor, the memory comprising instructions that when executed by the processor cause the processor to:
   identify a request to enable execution of an extended function of a mobile device
   determine a current power level of a power source,
   determine whether the current power level of the power source is greater than a first threshold value, the first threshold value corresponding to a quantity of power needed to operate a fundamental function of the mobile device for a predetermined amount of time, and
   permit operation of the extended function based on a determination that the current power level of the power source is greater than the first threshold value, or
   determine whether the current power level of the power source is less than a second threshold value, the second threshold value lower than the first threshold value, and
   prohibit operation of the extended function based on a determination that the current power level of the power source is less than the second threshold value to preserve operation of the fundamental function of the mobile device.

2. The apparatus of claim 1, the instructions when executed by the processor cause the processor to the processor to determine the fundamental function for the device based on a user setting or a provisioned setting, the fundamental function to comprise a default state for the device.

3. The apparatus of claim 1, the instructions when executed by the processor cause the processor to determine the first threshold value based on a user setting or a provisioned setting.

4. The apparatus claim 1, the predetermined amount of time corresponding to a minimum operation time based on a user setting or a provisioned setting.

5. The apparatus of claim 1, the instructions when executed by the processor cause the processor to:
   detect a power level of the power source below the first threshold value; and
   in response to the detection, terminate operation of one or more extended functions operating on the device.

6. The apparatus of claim 5, the instructions when executed by the processor cause the processor to:
   terminate execution of one or more instructions for the one or more extended functions; and
   cause one or more hardware components associated with the one the or more extended functions to enter a lower power state.

7. The apparatus of claim 1, comprising:
   a system on chip (SoC) comprising the processor, the memory, the power source, and an input/output (I/O) interface coupled with an input device.

8. The apparatus of claim 1, the instructions when executed by the processor cause the processor to:
   receive a request to permit operation of the extended function despite a determination that the current power level of the power source is not greater than the first threshold value, and
   permit operation of the extended function based on a determination that the current power level of the power source is not less than the second threshold value.

9. The apparatus of claim 8, the instructions when executed by the processor cause the processor to:
   request permission from a user to permit operation of the extended function despite the determination that the current power level of the power source is not greater than the first threshold value.

10. A computer-implemented method, comprising:
    identifying a request to enable execution of an extended function of a mobile device;
    determining a current power level of a power source;
    determining whether the current power level of the power source is greater than a first threshold value, the first threshold value corresponding to a quantity of power needed to operate a fundamental function of the mobile device for a predetermined amount of time, and
    permitting operation of the extended function based on a determination that the current power level of the power source is greater than the first threshold value, or
    determining whether the current power level of the power source is less than a second threshold value, the second threshold value lower than the first threshold value, and
    prohibiting operation of the extended function based on a determination that the current power level of the power source is less than the second threshold value to preserve operation of the fundamental function of the mobile device.

11. The computer-implemented method of claim 10, comprising:
    determining the fundamental function for the device based on a user setting or a provisioned setting, the fundamental function comprising a core function for the device.

12. The computer-implemented method of claim 10, comprising:
    determining the first threshold value based on a user setting or a provisioned setting.

13. The computer-implemented method of claim 10, the predetermined amount of time corresponding to a minimum operation time based on a user setting or a provisioned setting.

14. The computer-implemented method of claim 10, comprising:
    detecting a power level of the power source below the first threshold value; and
    in response to detecting, terminating operation of the extended function on the device.

15. The computer-implemented method of claim 14, comprising:
    terminating execution of one or more instructions for the one or more extended functions; and
    causing one or more hardware components associated with the one or more extended functions to enter a lower power state.

16. The computer-implemented method of claim 10, comprising:
    receiving a request to permit operation of the extended function despite a determination that the current power level of the power source is not greater than the first threshold value, and
    permitting operation of the extended function based on a determination that the current power level of the power source is not less than the second threshold value.

17. The computer-implemented method of claim 16, comprising:
    request permission from a user to permit operation of the extended function despite the determination that the current power level of the power source is not greater than the first threshold value.

18. A non-transitory computer-readable storage medium comprising a plurality of instructions that, when executed by processing circuitry, enable the processing circuitry to:
    identify a request to enable execution of an extended function of a mobile device,
    determine a current power level of a power source,
    determine whether the current power level of the power source is greater than a first threshold value, the first threshold value corresponding to a quantity of power needed to operate a fundamental function of the mobile device for a predetermined amount of time, and
    permit operation of the extended function based on a determination that the current power level of the power source is greater than the first threshold value, or
    determine whether the current power level of the power source is less than a second threshold value, the second threshold value lower than the first threshold value, and
    prohibit operation of the extended function based on a determination that the current power level of the power source is less than the second threshold value to preserve operation of the fundamental function of the mobile device.

19. The non-transitory computer-readable storage medium of claim 18 comprising a plurality of instructions, that when executed, enable processing circuitry to determine the fundamental function for the device based on a user setting or a provisioned setting, the fundamental function comprising a core function for the device.

20. The non-transitory computer-readable storage medium of claim 18, comprising a plurality of instructions, that when executed, enable processing circuitry to
determine the first threshold value based on a user setting or a provisioned setting.

21. The non-transitory computer-readable storage medium of claim 18, the predetermined amount of time corresponding to a minimum operation time based on a user setting or a provisioned setting.

22. The non-transitory computer-readable storage medium of claim 18, comprising a plurality of instructions, that when executed, enable processing circuitry to:
detect a power level of the power source below the first threshold value; and
in response to the detection, terminate operation of one or more extended functions operating on the device.

23. The non-transitory computer-readable storage medium of claim 18, comprising a plurality of instructions, that when executed, enable processing circuitry to:
terminate execution of one or more instructions for the one or more extended functions; and
cause one or more hardware components associated with the one or more extended functions to enter a lower power state.

24. The non-transitory computer-readable storage medium of claim 18, comprising a plurality of instructions, that when executed, enable processing circuitry to:
receive a request to permit operation of the extended function despite a determination that the current power level of the power source is not greater than the first threshold value, and
permit operation of the extended function based on a determination that the current power level of the power source is not less than the second threshold value.

25. The non-transitory computer-readable storage medium of claim 24, comprising a plurality of instructions, that when executed, enable processing circuitry to:
request permission from a user to permit operation of the extended function despite the determination that the current power level of the power source is not greater than the first threshold value.

* * * * *